(12) United States Patent
Nemery et al.

(10) Patent No.: US 9,836,522 B2
(45) Date of Patent: Dec. 5, 2017

(54) FRAMEWORK FOR ORDERED CLUSTERING

(71) Applicant: SAP SE, Walldorf (DE)

(72) Inventors: Philippe Jehan Nemery, Shanghai (CN); Mengjiao Wang, Shanghai (CN)

(73) Assignee: SAP SE, Walldorf (DE)

( * ) Notice: Subject to any disclaimer, the term of this patent is extended or adjusted under 35 U.S.C. 154(b) by 393 days.

(21) Appl. No.: 14/659,638

(22) Filed: Mar. 17, 2015

(65) Prior Publication Data

US 2016/0275168 A1    Sep. 22, 2016

(51) Int. Cl.
G06F 17/30 (2006.01)

(52) U.S. Cl.
CPC .... G06F 17/30598 (2013.01); G06F 17/3053 (2013.01)

(58) Field of Classification Search
CPC .............. G06F 17/30598; G06F 17/3053
USPC .............................................. 707/737
See application file for complete search history.

(56) References Cited

U.S. PATENT DOCUMENTS

| | | | | |
|---|---|---|---|---|
| 6,598,054 B2* | 7/2003 | Schuetze | ........... | G06F 17/30713 |
| 7,840,568 B2* | 11/2010 | Purang | .............. | G06F 17/30029 |
| | | | | 707/737 |
| 8,280,829 B2* | 10/2012 | Chapelle | .............. | G06N 99/005 |
| | | | | 706/12 |
| 8,301,617 B2* | 10/2012 | Muntz | .................... | G06Q 10/00 |
| | | | | 705/319 |
| 8,600,920 B2* | 12/2013 | Flynn | ..................... | G06N 5/048 |
| | | | | 706/45 |
| 2007/0286218 A1* | 12/2007 | Zhang | .................. | H04L 45/123 |
| | | | | 370/401 |
| 2011/0219012 A1* | 9/2011 | Yih | ......................... | G06F 15/18 |
| | | | | 707/749 |
| 2013/0238626 A1* | 9/2013 | Denney | ............ | G06F 17/30244 |
| | | | | 707/737 |
| 2013/0339290 A1* | 12/2013 | Lee | ........................ | G06F 17/10 |
| | | | | 706/55 |
| 2014/0379520 A1* | 12/2014 | Nemery | ............ | G06Q 30/0631 |
| | | | | 705/26.7 |
| 2015/0067043 A1* | 3/2015 | Agarwal | ................ | G06Q 10/06 |
| | | | | 709/204 |
| 2015/0294230 A1* | 10/2015 | Mukherjee | ........ | G06F 17/30598 |
| | | | | 706/52 |
| 2016/0092781 A1* | 3/2016 | Byrnes | ............. | G06F 17/30395 |
| | | | | 706/52 |
| 2016/0232254 A1* | 8/2016 | Chehreghani | ..... | G06F 17/30958 |

OTHER PUBLICATIONS

Nemery, Philippe, "On the use of multicriteria ranking methods in sorting problems", Universite libre de Bruxelles, Brussels, Belgium, Thesis, Nov. 2009, 319 pages.*

(Continued)

*Primary Examiner* — Robert Stevens
(74) *Attorney, Agent, or Firm* — Klarquist Sparkman, LLP

(57) ABSTRACT

A framework for clustering is described herein. In accordance with one aspect, a data set having x number of objects, and preference information of a user is provided to a clustering tool. The clustering tool may calculate preference degrees between objects in the data set. In addition, similarity measures of objects in the data set may be calculated. Clusters of objects may then be generated from the data set.

20 Claims, 11 Drawing Sheets

(56) References Cited

OTHER PUBLICATIONS

Ishizaka, Alessio, et al., "Assigning machines to incomparable maintenance strategies with ELECTRE-SORT", Omega, vol. 47, Elsevier, Ltd., Mar. 27, 2014, pp. 45-59.*

De Smet, Yves, et al., "An exact algorithm for the multicriteria ordered clustering problem", Omega, vol. 40, Elsevier, Ltd., Feb. 3, 2102, pp. 861-869.*

Brans, Jean-Pierre, "Chapter 5: Promethee Methods", Multiple Criteria Decision Analysis: State of the Art Surveys, vol. 78 of the series: International Series in Operations Research & Management Science, Springer Science + Business Media, Inc., Boston, MA, (c) 2005, pp. 163-195.*

Corrente, Salvatore, et al., "Multiple Criteria Hierarchy Process with Electre and Promethee", Omega, vol. 41, Elsevier, Ltd., Nov. 2, 2102, pp. 820-846.*

Doumpos, Michael, et al., "A multicriteria classification approach based on pairwise comparisons", European Journal of Operational Research, vol. 158, Elsevier B.V. (Science Direct), Oct. 8, 2003, pp. 378-389.*

Fernandez, Eduardo, et al., "Handling multicriteria preferences in cluster analysis", European Journal of Operational Research, vol. 202, Elsevier B.V., Jun. 2, 2009, pp. 819-827.*

De Smet, Yves, et al., "Towards multicriteria clustering: An extension of the k-means algorithm", European Journal of Operational Research, vol. 158, Elsevier B.V. (Science Direct), Oct. 8, 2003, pp. 367-375.*

Mela, Kristo, et al., "Comparative study of multiple criteria decision making methods for building design", Advanced Engineering Informatics, vol. 26, Elsevier, Ltd., Apr. 9, 2012, pp. 716-726.*

Caulkins, Jonathan P., et al., "Multiple equilibria and indifference-threshold points in a rational addiction model", CEJOR, vol. 21, Springer, pp. 507-522.*

Jin, Rong, et al., "Preference-based Graphic Models for Collaborative Filtering", UIA '03, Acapulco, Mexico, Aug. 7-10, 2003, pp. 329-336.*

Wei, Chih-Ping, et al., "Combining preference- and content-based approaches for improving document clustering effectiveness", Information Processing and Management, vol. 42, Elsevier, Ltd., Aug. 24, 2005, pp. 350-372.*

Brans, J. P., et al., "A Preference Ranking Organisation Method", Management Science, vol. 31, No. 6, Jun. 1985, pp. 647-656.*

A.K. Jain et al., Data Clustering: A Review, ACM Computing Surveys, Sep. 1999, pp. 1-60, vol. 31, No. 3, ACM Inc.

\* cited by examiner

Preference Based clustering
---
1: FUNCTION Clustering
2: BEGIN
3:   // Supposed that all the preference information is provided by the user
4:   Compute Preference Degree $\pi_{i,j}$ between all objects based on the preference information.
5:   Define the preference relationship $P_I$, $P_J$, $P_{p+}$ and $P_{p-}$ between all objects based on $\lambda$
6:   FOR $\forall x \in A$
7:     Compute the Sets $P_i^a = \{x | a P_i x, \forall x \in A\}$ for the relationships $P_I$, $P_J$, $P_{p+}$ and $P_{p-}$
8:   END FOR
9:   FOR $\forall x, y \in A$
10:     Compute the similarity measure $S(x,y)$
11:  END FOR
12:  Define betweenness-threshold and Eliminate low betweenness values
13:  WHILE(edges left)
14:    Compute betweenness of edges
15:    Remove edge with highest betweenness
16:  END WHILE
17:  Display Clustering
18: END

FRAMEWORK FOR ORDERED CLUSTERING

TECHNICAL FIELD

The present disclosure relates generally to a framework for generating ordered clusters.

BACKGROUND

Clustering is the task of grouping a set of objects in such a way that the objects in the same group or cluster are more similar to each other than to those in other groups. Various clustering techniques exist. Conventional clustering techniques are based on intrinsic characteristics or attributes of objects which are used to compute similarity degrees or distances between objects. The similarity degrees or distances are processed to group the objects into clusters. As such, conventional clustering techniques group objects into clusters based solely on distances. This may result in inaccurate groupings according to a user's objective.

The present disclosure relates to ordered clusters which takes user preferences into consideration.

SUMMARY

A framework for clustering is described herein. In accordance with one aspect, a data set having x number of objects, and preference information of a user is provided to a clustering tool. The clustering tool may calculate preference degrees between objects in the data set. In addition, similarity measures of objects in the data set may be calculated. Clusters of objects may then be generated from the data set.

In accordance with another aspect, a clustering system for determining an order of clusters is provided. The clustering system includes an input module, which includes user preference information of a user, a preference degree module for calculating preference degrees of a data set containing x number of objects based on user preference information, a similarity module for determining similarity measures of objects in the data set, and a clustering module for generating clusters of objects based on similarity measures.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIG. 7 shows a simplified pseudo code illustrating a clustering process of an embodiment of a clustering framework;

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

Figure 1:
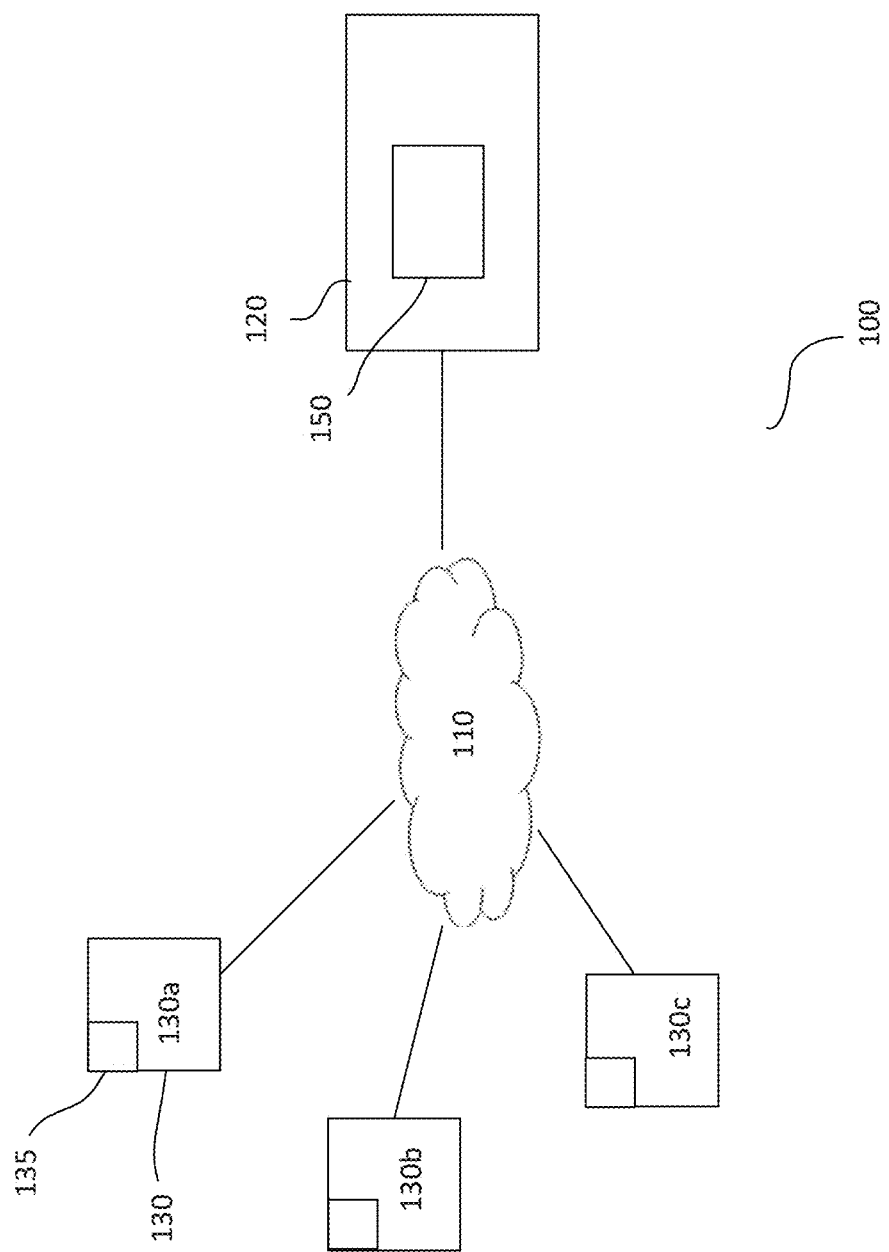
FIG. 1 shows a simplified diagram of an exemplary environment or architecture.

FIG. 1 shows a simplified diagram of an exemplary environment or architecture 100. The environment 100 may have a distributed architecture, such as a client-server architecture. The environment, in one implementation, includes a communication network 110. The communication network, for example, may be the World Wide Web (WWW or Web). Other types of communication networks or combination of networks may also be useful.

The environment includes a server 120. A server may be a computer with a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component.

The server 120, for example, may include a plurality of interconnected servers. For example, the servers are interconnected by a communication network. The communication network may be an internet, an intranet, a local area network (LAN), a wide area network (WAN) or a combination thereof. The servers may be located in a single or multiple locations. The interconnected servers may be collectively referred to as a server.

The server 120 is configured to store and process resources requested by client devices 130. As shown, the environment includes client devices 130a-130c. It is understood that the environment may include other number of client devices. A client device may be a local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as the client device. For example, the client device may be a PC, a tablet PC, a workstation, a network computer, or a mobile computing device, such as a laptop, a tab or a smart phone. Other types of processing devices may also be used. It is understood that client devices may be different types of client devices.

The environment of the client device may be referred to as a local or native environment. A client (or end-user) and client device may be used interchangeably. For example, when referring to an end-user, it is understood that the end-user connects to the communication network using a client device. The client device may be referred to as the client side while the server may be referred to as the server side. It is understood that client devices need not be of the same type. For example, some client devices may be mobile devices running on different types of platforms, such as iOS or Android, while other client devices may be desktop or laptop computers.

In one implementation, the local environment of the client device includes a user agent 135. The user agent, for example, may be a web browser. The browser facilitates communication with the server. For example, the browser initiates communication to a web server by making a request for a specific resource using, for example, a Hypertext Transfer Protocol (HTTP) and the server responds with the content of that resource. Communication with the server, for example, may be through internet connection. The internet connection may be using a mobile telecommunication network, such as a 4G network. Other types of connections to the server may also be useful. An end-user may access the server by, for example, having a user account.

In other implementations, the environment 100 may be a cloud computing environment. In such cases, the interconnected servers 120 form a cloud. The cloud, for example, hosts and processes resources, such as applications and data, as well as other resources. Different servers may be used to store or process different resources. Such hosting and processing may be considered as cloud services. Various types of cloud services may be provided. The cloud services may be provided in a public, private or hybrid network. The cloud services may be provided by a cloud service provider. For example, the cloud services may be SAP HANA Cloud Platform provided by SAP SE. Other types of clouds and cloud providers may also be useful. A client device 130 accesses resources on the cloud using, for example, a browser 135. Other configurations of the environment may also be useful.

The environment 100 includes a framework 150 for generating clusters. The framework, for example, is a software tool. For example, the framework is a software tool which analyzes items or objects and groups them into clusters. In one implementation, the framework groups items into ordered clusters taking into consideration a user's preference. The framework, for example, may be an ordered clustering framework. The ordered clustering framework generates ordered clusters taking into consideration a user's preference. In one implementation, the framework is a network-based ordered clustering framework. For example, the framework generates ordered clusters based on a user's preference using a network-based clustering technique. Various types of network-based clustering techniques, such as Girvan-Newman, OSLOM, modularity maximization, as well as others, may be employed.

The framework, in one implementation, resides on the server 120. Locating the framework in other locations may also be useful. For example, the framework may be a stand-alone framework and resides on an end-user device. The framework may be configured to receive a list of objects for clustering based on user preferences. The framework includes memory for storing user preference information provided by users as well as clustering results.

Figure 2:
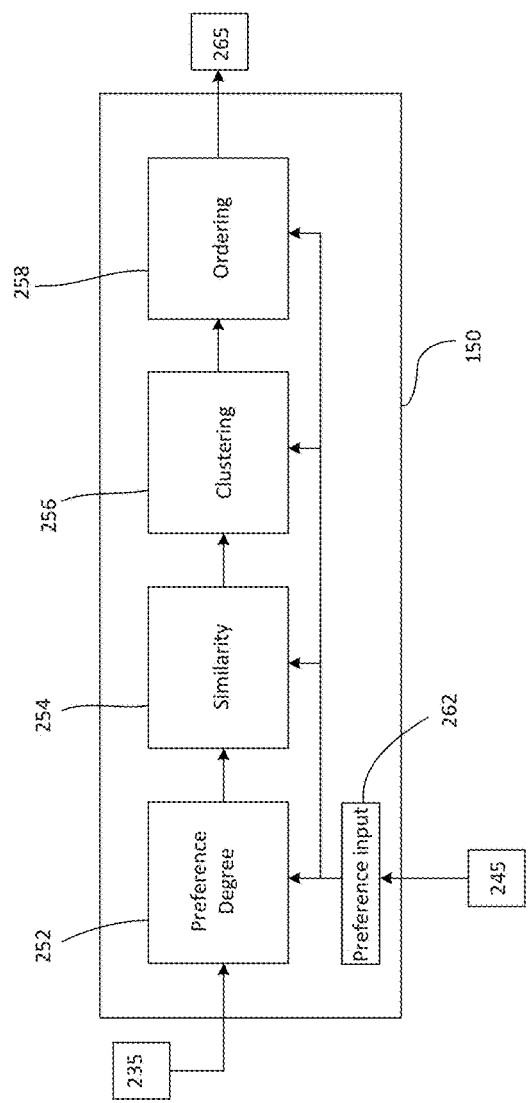
FIG. 2 shows a simplified block diagram of an embodiment of an ordered clustering framework.

FIG. 2 shows a simplified block diagram of an embodiment of a clustering framework 150. In one implementation, the clustering framework is a network-based ordered clustering framework. As shown, the framework includes a preference degree module 252, a similarity module 254, a clustering module 256, and an ordering module 258. The ordered clustering framework receives and processes a data set 235. The data set may be referred to as data set A. Data set A includes items or objects of interest. For example, data set A includes objects $a_1$-$a_x$, where a represents an object and x equals the number of objects in the data set A. The framework processes the objects in data set A and generates a list of ordered clusters 265 using the various framework modules according to preference information 245 of the user, such as a decision maker.

The data set can be derived using various techniques. For example, the type of objects in the data set may depend on the application of the clustering framework. For example, objects may be goods for sale listed by a seller or a group of sellers for identifying specific items for sale, information used in management of building resources, traffic information of vehicles for traffic management, employee information of a company for human resource management, supplier information for procurement management. Other types of objects may also be useful. The data set may be derived from a data acquisition system, such as a sensor network, a database containing a list of items of interest, data mining or from other techniques, including, connected objects such as Internet of Thing (IoT) devices.

The preference degree module 252 constructs preference degrees K among the objects in the data set. In one implementation, constructing the preference degrees is based on preference information 245 provided by the user. Preference information may include indifference, preference, or veto thresholds. A veto threshold, for example, may be used to exclude objects from consideration by comparing to other objects. Other types of preference information may also be useful. The various preference information may be provided by the user using a preference input module 262. For example, the preference input module includes a preference input graphical interface (GI) for users to input preference information 245. Other techniques for providing preference information of the user or decision maker may also be useful. For example, a wizard or non-graphical interface may be used to enable the user to input preference information.

In other implementations, the preference input module 262 may be a preference information retrieval module. For example, the preference information retrieval module may be an intelligent module for retrieving user preference information. The intelligent module may be based on a recommendation or statistical aggregation system. For example, the intelligent module may analyze historical user information to determine user preference. User preference may be based on average of preferences of users that are collected. Other techniques for intelligently acquiring user preference information may also be useful.

Constructing the preference degrees among the objects includes performing pairwise comparisons of objects $a_1$-$a_x$ in the data set A based on user preference information. Pairwise comparisons of objects include comparing an object in the data set with other objects of the data set. Pairwise comparisons include comparing each object as an ordered pair with each and every other object in the data set. For example, a preference degree $\pi_{ij}$ corresponds to the preference degree of object $a_i$ compared to object $a_j$. The preference degrees from the pairwise comparisons may be stored in a matrix $\Pi$.

Preference degrees have values between 0 and 1. Furthermore, preference degrees are not symmetrical. This asymmetry enables a pairwise comparison to have three different situations:

1) $\pi_{ij} \approx \pi_{ji} \approx 0$;
2) $\pi_{ij} \approx \pi_{ji} \approx 0.5$; or
3) $\pi_{ij} \gg \pi_{ji}$.

In situation 1, preference degrees for comparison between two objects are about the same in both directions and equal to about 0. This indicates that there is no preferred object between the two compared objects and the compared objects are considered indifferent by the decision maker, such as the user. An indifferent relationship may be expressed as $P_I$: $a_i P_I a_j$, where $P_I$ is the indifference relationship between object $a_i$ and object $a_j$. In situation 2, preference degrees for comparison between two objects are about the same in both directions and equal to about 0.5. This indicates that there is no preferred object between the two compared objects, but both object $a_i$ and object $a_j$ of the comparison have good and weak points. In such cases, the objects are considered incomparable by the decision maker. An incomparable relationship may be expressed as $P_J$: $a_i P_J a_j$, where $P_J$ is the incomparability relationship between object $a_i$ and object $a_j$.

In situation 3, a preference degree for comparison between two objects is much greater in one direction than the other. This indicates that one object is preferred over the other object. For example, object $a_i$ is preferred over object $a_j$ by the decision maker, such as the user. A preferred relationship may be expressed as $P_{P^+}$: $a_i P_{P^+} a_j$, where $P_{P^+}$ is the preferred relationship between object $a_i$ to object $a_j$. On the other hand, in the case where object $a_j$ is preferred over $a_i$, the relationship may be a preferred-by relationship. For example, $a_i$ is preferred by $a_j$. A preferred-by relationship may be expressed as $a_i$: $a_i P_{P^-} a_j$, where $P_{P^-}$ is the preferred-by relationship of object $a_i$ by object $a_j$. For example, $P_{P^-}$ is the preference degree by object j to object i.

Various relationships between two actions (two directional comparisons of two objects) may exist as follows based on preference degrees when $\lambda$ is used as threshold, where $0.5 < \lambda < 1$:

1) $a_i P_J a_j \Leftrightarrow |\pi_{ij} - \pi_{ji}| < \lambda$ and $\pi_{ij} < \lambda$;
2) $a_i P_J a_j \Leftrightarrow |\pi_{ij} - \pi_{ji}| < \lambda$ and $\pi_{ij} > \lambda$; and
3) $a_i P_{P^+} a_j \Leftrightarrow |\pi_{ij} - \pi_{ji}| > \lambda$ and $\pi_{ij} > \lambda \Leftrightarrow a_j P_{P^-} a_i$.

The parameter $\lambda$ is a technical parameter. It has a value from 0.5 to 1. This parameter may be defined by the user.

In one implementation, preference degrees may be computed based on a set of criteria. For example, the objects are evaluated by a set criteria $F=\{f_1, f_2, \ldots, f_y\}$, where the set includes y number of criteria. The criteria may depend on the objects being compared. For example, a retail object may have criteria which includes price, material, quality, and customer evaluations. In the case of an automobile, criteria may include price, miles per gallon, color, convertible, sedan, rear wheel drive and engine type. A criterion, for example, may be maximized or minimized. The maximizing or minimizing may depend on the user. For example, if the user is a seller, the price criterion of the object may be maximized. On the other hand, if the user is a buyer, the price criterion of the object may be minimized. Additionally, some criterion of a set, for example, may be maximized while others from the same set may be minimized.

A decision maker, such as a user, may provide parameters for each criterion $f_m$. In one implementation, the parameters include:

1) $w_m$ (the normalized weight of each criterion in the set);
2) $q_m$ (the indifference threshold that reflects a threshold under which the difference of performances between objects is considered as insignificant);
3) $p_m$ (the preference threshold that reflects a threshold above which the difference of performances between objects lead to prefer strongly the object with the highest value on that criterion); and
4) veto thresholds (a veto threshold may be associated with each criterion).

Providing other parameters may also be useful.

Unicriterion preference degrees are computed. A unicriterion preference degree $P_{ij}^k$ reflects how strongly object $a_i$ is preferred over object $a_j$ based on criterion $f_k$. Unicriterion preference degrees have values between 0 and 1. A unicriterion preference degree $P_{ij}^k$ may be a function of the difference between the evaluations of objects, such as $f_k(a_i) - f_k(a_j)$. The higher the difference, the stronger the unicriterion preference. The unicriterion preference degree for criterion $f_k$ of objects $a_i$ and $a_j$ may be calculated by Equation 1 as follows:

$$P_{ij}^k = \begin{cases} 0 & \text{if } f_k(a_i) - f_k(a_j) \leq q_k \\ \dfrac{[f_k(a_i) - f_k(a_j) - q_k]}{[p_k - q_k]} & \text{if } q_k < f_k(a_i) - f_k(a_j) < p_k \\ 1 & \text{if } f_k(a_i) - f_k(a_j) \geq p_k \end{cases} \quad \text{(Equation 1)}$$

The unicriterion preference degree is calculated for all criteria with respect to the pairwise comparison of object $a_i$ versus object $a_j$. For example, the unicriterion preference degree is calculated for $f_1-f_y$ for object $a_i$ compared to object $a_j$. After unicriterion preference degrees are calculated, they are aggregated. Equation 2 below shows aggregation of unicriterion degrees to produce a preference degree $\pi_{ij}$:

$$\pi(a_i, a_j) = \pi_{ij} = \sum_{k=1}^{y} w_k * P_{ij}^k \quad \text{(Equation 2)}$$

The preference degree $\pi_{ij}$ represents the global comparison of object $a_i$ versus object $a_j$. Preference degrees $\pi$ are calculated for other object pairs in the data set A to produce preference degrees of other pairwise comparisons, which may be stored in the matrix $\Pi$.

To illustrate the asymmetry of preference degrees, an exemplary data set A with a set of criteria is provided below. Table 1 below illustrates an example of a data set with four objects (e.g., $a_x=4$) and 2 criteria (e.g., $f_y=2$):

TABLE 1

|   | criterion 1 | criterion 2 |
|---|---|---|
| a | 0 | 0 |
| b | 5 | 0 |
| c | 0 | 5 |
| d | 10 | 10 |

As shown, data set A includes four objects (a, b, c, d) and the set of criteria includes two criteria (criterion 1, criterion 2). The values for each criterion as it relates to the objects are provided. The values may depend on the criterion. For example, if the criterion is quality, the value would be a quality rating of the object.

Two different scenarios are provided. Scenario 1 relates to a first user and scenario 2 relates to a second user. The parameters of w, q and p of scenario 1 are as follows:
$w_1=w_2=0.5$;
$q_1=q_2=0$; and
$p_1=p_2=0$.
The parameters of scenario 2 are as follows:
$w_1=0.333$, $w_2=0.66$;
$q_1=0.5$, $q_2=0$; and
$p_1=0.5$, $p_2=0$.
Regarding subscript 1 and 2, they relate to the criterion. For example, subscript 1 relates to the first criterion, while subscript 2 relates to the second criterion.

Preference degrees for scenario 1 are calculated for the different object pairs and provided in Table 2 as follows:

TABLE 2

|   | a | b | c | d |
|---|---|---|---|---|
| a |   | 0 | 0 | 0 |
| b | 1 |   | 0.5 | 0 |
| c | 1 | 0.5 |   | 0 |
| d | 1 | 1 | 1 |   |

Table 2, for example, may be an example of a preference degree matrix Π. Clearly, as shown in Table 2, the preference degrees are asymmetrical. For example, $\pi_{ab}=0$ while $\pi_{ba}=1$. For pairwise comparisons of the same object, the preference degrees are left blank. Alternatively, pairwise comparisons of the same object may be equal to 0.

Preference degrees for scenario 2 are calculated for the different object pairs and provided in Table 3 as follows:

TABLE 3

|   | a | b | c | d |
|---|---|---|---|---|
| a |   | 0 | 0 | 0 |
| b | 0 |   | 0 | 0 |
| c | 0.33 | 0.33 |   | 0 |
| d | 1 | 0.33 | 1 |   |

Clearly, as shown in Table 3, the preference degrees are asymmetrical. For example, $\pi_{ac}=0$ while $\pi_{ca}=0.33$.

Figure 3A:
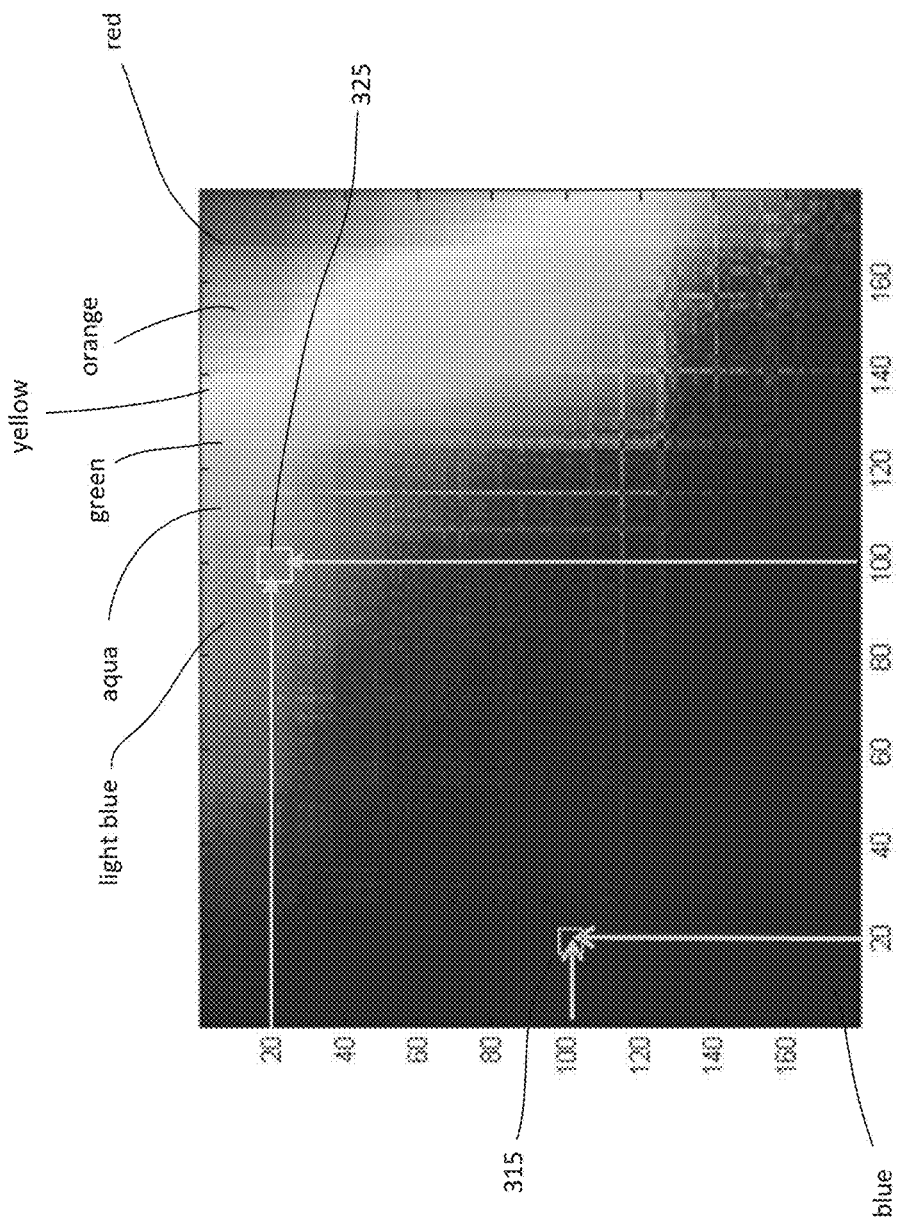
FIG. 3a shows a visual representation of preference degrees from pairwise comparison.

FIG. 3a shows an exemplary color chart 305 of preference degrees between objects. The preference degrees are for a data set with 160 objects. The various colors of the preference degrees range from blue to red. The color range corresponds to preference degree value from 0 to 1. In one implementation, the color blue represents a preference degree $\pi_{ij}=0$ while the color red represents a preference degree $\pi_{ij}=1$. As the colors transitions from blue to red, the preference degree $\pi_{ij}$ increases from 0 to 1. From the chart, pairwise comparisons are not symmetrical. For example, the preference degree $\pi_{100,20}=0$ (at 315) while preference degree $\pi_{20,100}$ (at 325) has a higher value than 0, due the difference in colors.

Referring back to FIG. 2, after the preference degrees are constructed, the similarity module determines similarity measures or indices of pairwise comparisons. A similarity measure is a measure of distances between two objects of the pairwise comparison, such as $a_i$ and $a_j$. The similarity measures take into account the preferred and preferred-by relationships from the preference degrees analysis. In one implementation, the similarity measures are symmetrical measures. Providing symmetrical measures reduce information while capturing global behavior of an object compared to other objects.

In one implementation, a similarity measure between two objects is determined by Equation 3 as follows:

$$S(a,b) = \frac{\sum_{1}^{4}|P_R^a \cap P_R^b|}{|A|} \quad \text{(Equation 3)}$$

where
a is the first object of the pairwise comparison (e.g., $a_i$),
b is the second object of the pairwise comparison (e.g., $a_j$),
R is from 1-4 which is equal to I, J, P$^+$ and P$^-$,
$P_R^a = \{x|aP_Rx, \forall x \in A\}$ for the relationships $P_I$, $P_J$, $P_{P+}$ and $P_{P-}$,
|A| is the total number of objects in set A,
|.| represents the number of elements/objects in the set,
x is element or object x,
x may be a, b, or any element of the set A.

From equation 3, the set of preferences $P_I$, $P_J$, $P_{P+}$ and $P_{P-}$ may be computed for each object to determine the similarity measures. Table 4 shows the different sets for a data set containing objects a, b, c, and d:

TABLE 4

|   | $P_I$ | $P_J$ | $P_{P+}$ | $P_{P-}$ |
|---|---|---|---|---|
| a | a | — | — | d, b, c |
| b | b | c | a | d |
| c | c | b | a | d |
| d | d | — | a, b, c | — |

From Table 4, regarding element a,
1) $P_I(a)$=all the elements of set {a, b, c, d} to which a is indifferent, which is ={a},
2) $P_J(a)$=all the elements of set {a, b, c, d} to which a is incomparable to, which is ={ } or empty,
3) $P_{P+}(a)$ all the elements of set {a, b, c, d} to which a is preferred to which is ={ } or empty, and
4) $P_{P-}(a)$ all the elements of set {a, b, c, d} which are preferred to a, which is ={d, b, c}.

The preference set can be repeated for all elements, such as elements b, c and d, as shown in Table 4.

Based on Equation 3, considering $P_{P+}^a \cap P_{P+}^b$, provides all the elements to which objects a and b are preferred to. The intersection set of the elements to which a is preferred and the set of elements to which b is preferred are analyzed.

If two elements are identical, then all the relationships to all the elements will be similar. As such, the sum of $|P_i^a \cap P_i^b|$, will be equal to |A|. This results in S(a,a)=1. The similarity measures S of pairwise comparisons may be stored in a similarity matrix δ. Table 5 as follows shows an example of a similarity matrix containing objects a, b, c, and d:

TABLE 5

| S(,) | a | b | c | d |
|---|---|---|---|---|
| a | 1 | 0 | 0 | 0 |
| b | 0 | 1 | 0.5 | 0.25 |
| c | 0 | 0.5 | 1 | 0.25 |
| d | 0 | 0.25 | 0.25 | 1 |

For instance, the exemplary similarity matrix in Table 5 may be for scenario 1 as described above.

The similarity measures indicate how strong the relation is between two objects. The higher the value is, the stronger the relation is. For example, as shown in Table 5, S(b,c)=0.5 while S(b,d) is 0.25. This means that b has a stronger relation to c than to d.

A similarity measure takes the preference relations directly into account. Taking the preference relations directly into account also takes the orientation of the criteria into account. This results in all the measures being symmetrical. For example, objects in a group are considered similar since they are preferred to and preferred by the same objects.

A distance matrix Δ can be derived from the similarity matrix. For example, the value in a distance matrix indicates the distance between two objects. The higher the value is, the weaker relation is. In other words, the distance values is the inverse of the similarity measures. The distance matrix, in one implementation, is derived from taking the reciprocal of the similarity measures. For example, D(x,y)=1/S(x,y), if S(x,y) equals to zero, then D(x,y) may be defined to be equal to infinity. Table 6 below shows an example of a distance matrix derived from the similarity matrix of Table 5:

TABLE 6

| D(,) | a | b | c | d |
|---|---|---|---|---|
| a | 1 | +∞ | +∞ | +∞ |
| b | +∞ | 1 | 2 | 4 |
| c | +∞ | 2 | 1 | 4 |
| d | +∞ | 4 | 4 | 1 |

Having both similarity and distance matrices provide flexibility. For example, some clustering techniques uses a similarity matrix while others use a distance matrix. In the case of the Girvan-Newman technique, a distance matrix is used. On the other hand, an OSLOM clustering technique uses a similarity matrix.

As discussed, the value in the distance matrix indicates how strong the relation is between an object and another object. Using the values in the distance matrix, a similarity network can be built. The network includes nodes for objects of the data set. An edge of the network is a relation between two objects. An edge is weighted by the corresponding value in the distance matrix. For example, each node is an object, with each edge being weighted by the corresponding value in the distance matrix.

Figure 3B:
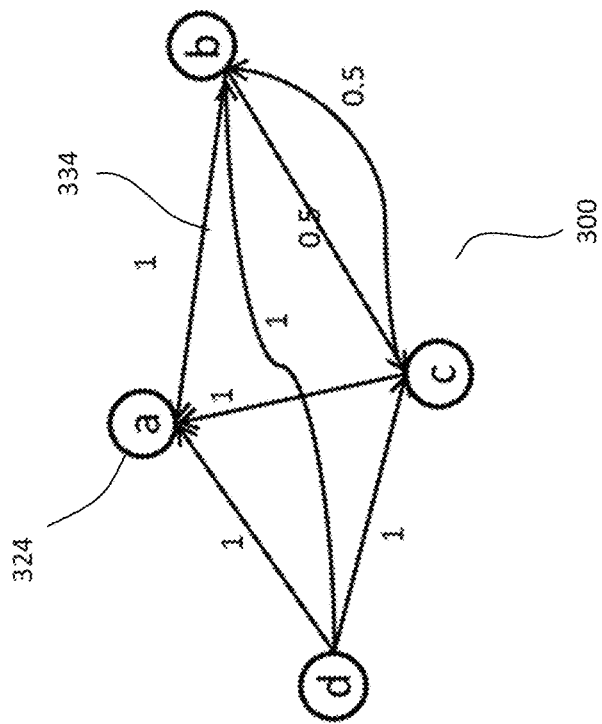
FIG. 3b shows an example of a similarity network.

FIG. 3b shows an example of a similarity network 300. The similarity network reflects scenario 1. The preference table (Table 2) for scenario 1 is shown with four objects corresponding to four nodes 324 of the network. Edges 334 with directions and distances are shown reflecting the directional relationship of the pairwise comparison. The distances reflect the distances in Table 2, with corresponding weights shown in Table 1.

Referring back to FIG. 2, the clustering module 256 generates clusters based on the similarity network. The clustering module may employ various clustering techniques to generate the clusters. The clustering technique finds a subset of nodes within which connections are dense and other subset of nodes whose connections are sparse. Dense connections refer to many connections between nodes while sparse connections refer to few connections between nodes. In one implementation, the clustering technique includes a Girvan-Newman technique. The Girvan-Newman technique is based on betweenness centrality (BC) of edges in the network. The betweenness centrality is equal to the number of shortest paths from all nodes to all others that pass through that edge, as expressed below by Equation 4:

$$BC(e) = \sum_{s \neq t \in V} \frac{\sigma_{st}(e)}{\sigma_{st}}$$ (Equation 4)

where $\sigma_{st}$ is the total number of shortest paths from node s to node t, $\sigma_{st}(e)$ is the number of those paths that pass through edge e, and V refers to vertex set (node set).

The betweenness is a property of an edge. For example, each edge has a betweenness centrality value. The betweenness centrality values may be stored in, for example, a BC matrix β.

Figure 4:
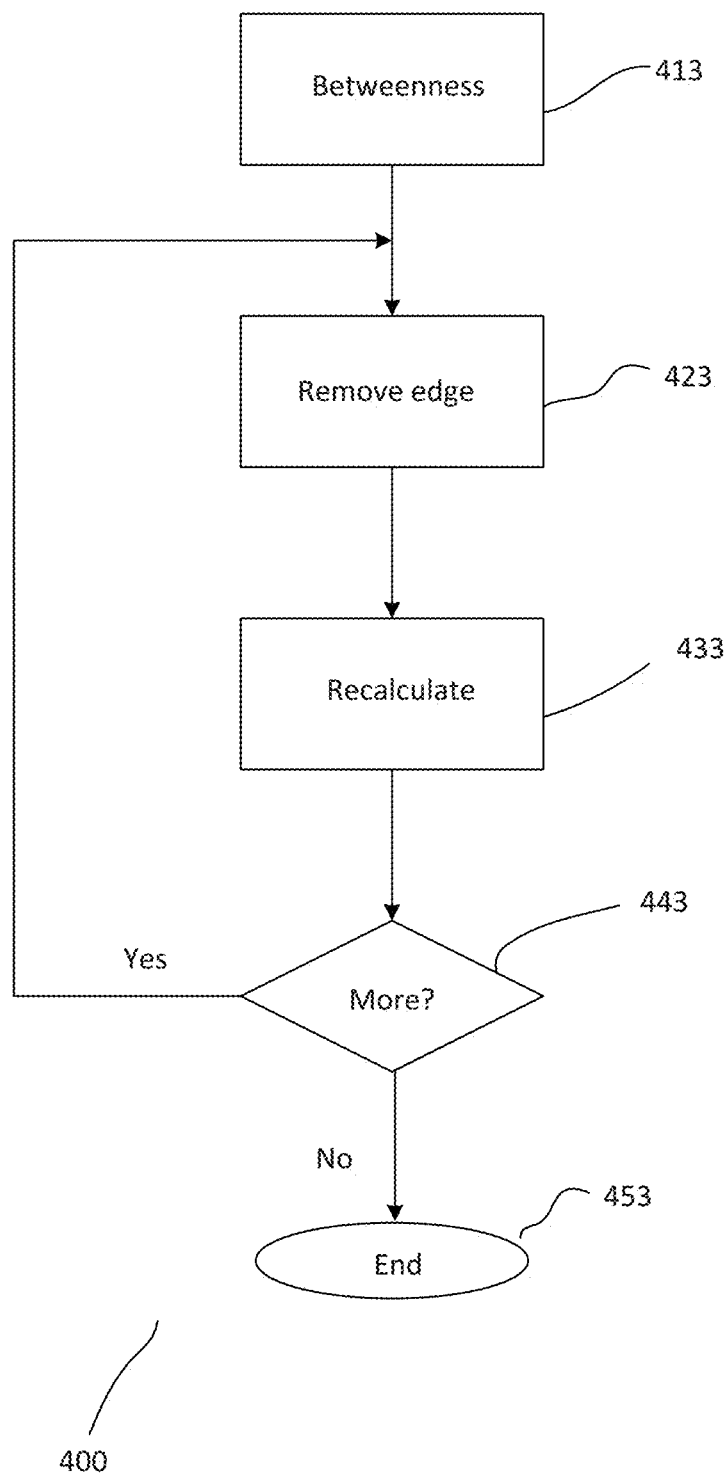
FIG. 4 shows an exemplary process flow for generating clusters.

Generating clusters includes various processing steps. FIG. 4 shows an exemplary process flow 400 for generating clusters using the Girvan-Newman technique. Other clustering techniques may also be useful. In one implementation, the betweenness of existing edges in the similarity network are calculated at step 413. For example, betweenness of all existing edges of the network is calculated using Equation 4. At step 423, the edge with the highest betweenness is removed. After removing the edge, betweenness values of edges affected by the removal are recalculated at step 433. At step 443, the process determines if there are any edges remaining. If there are, the process returns to step 423. If there are no more edges, the process ends at step 453, resulting in clusters.

Figure 5:
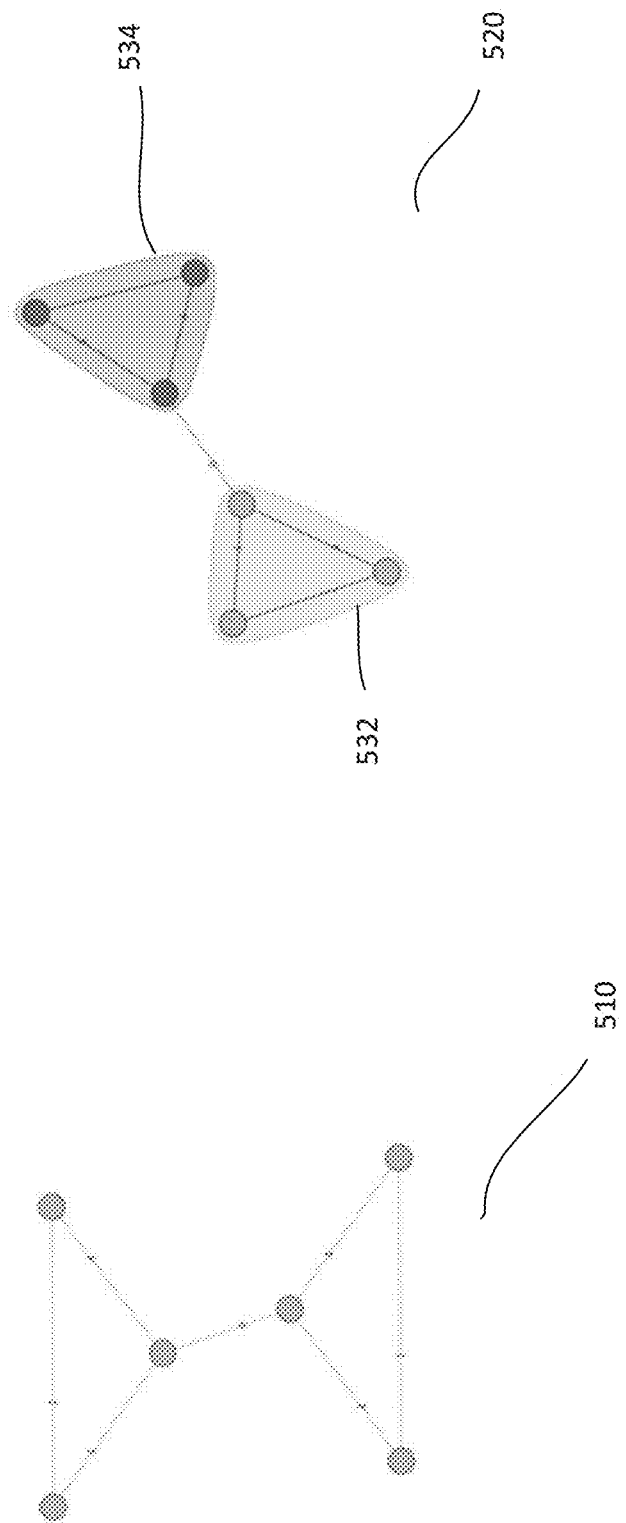
FIGS. 5a-5b illustrate an example of an implementation of clustering.

FIGS. 5a-5b illustrate an example of an implementation of clustering. Referring to FIG. 5a, a similarity network 510 is shown. The similarity network shows nodes with betweenness. FIG. 5b shows the similarity network 520 after applying Girvan-Newman clustering technique. As shown, the nodes are grouped into two clusters 532 and 534.

Referring back to FIG. 2, the clustering module receives an input parameter k. The input parameter k relates to the number of clusters to be generated by the clustering module. The input parameter k, for example, may be provided by the decision maker, such as the user. The input parameter k, in one implementation, is related to the betweenness-threshold. For example, in the case of a clustering module employing a Girvan-Newman technique, k is indirectly specified by the betweenness-threshold or BC-threshold. The betweenness-threshold indicates which BC values are filtered out from the BC matrix β. In one implementation, low BC values (values below the betweenness-threshold) are filtered out from the matrix. For example, the cluster module preprocesses the BC values to remove edges having BC values below the BC-threshold.

The betweenness-threshold is selected to produce about n clusters. In one implementation, the betweenness-threshold is selected to produce about 3-4 clusters (e.g., n=3-4). Selecting a betweenness-threshold which produces other values of n may also be useful. For example, n may be any positive integer. The betweenness-threshold is from 0-1. In one implementation, the betweenness-threshold is about 0.30 to about 0.8. Preferably, the betweenness-threshold value may be about 0.35-0.8. More preferably, the betweenness-threshold value may be about 0.35-0.5. Other betweenness-threshold values are also useful.

Figure 6:
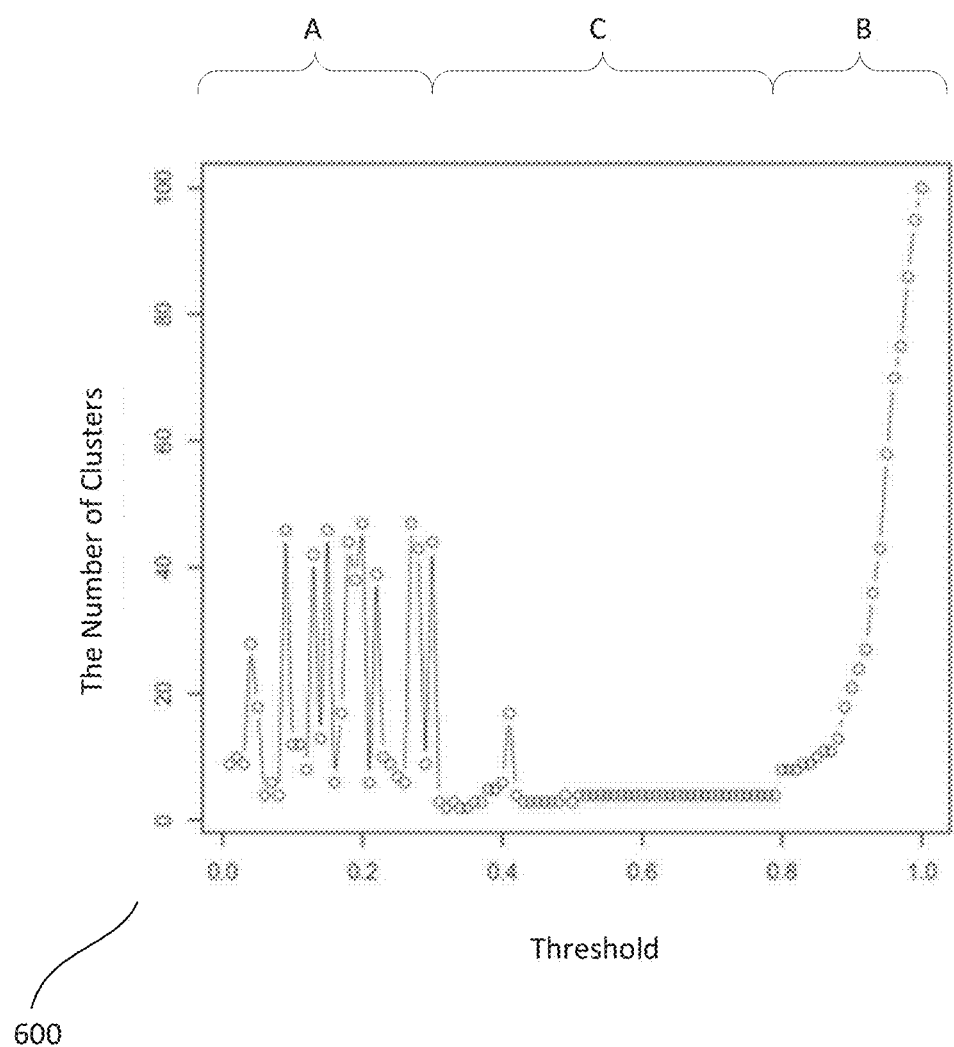
FIG. 6 shows a graph which represents the number of clusters as a function of betweenness-threshold for a data set.

FIG. 6 illustrates a graph 600 which represents the number of clusters as a function of betweenness-threshold for an exemplary data set. As can be seen, the chart includes "unstable" zones A and B, represented by quick changes in the number of clusters with relatively small changes of the threshold. Also, the chart includes a "stable" zone C, represented by relatively stable number of clusters with relatively large changes in threshold. The stable zone indicates a "natural" number of clusters in the dataset. The natural number, for example, may be about 3-4. As shown, the stable zone C for the exemplary data set has a threshold value between about 0.3-0.8.

FIG. 7 shows a simplified pseudo code 700 illustrating a clustering process of an embodiment of a clustering framework. The clustering framework, for example, may be a function which can be called to perform clustering on a data set, such as data set A. As shown, the framework function is named "clustering". The clustering function receives preference information from a user, such as the decision maker. The preference, for example, may include the weight of the various criteria as well as indifference and preference thresholds. Other preference information, such as betweenness-threshold or k as well as λ may also be provided. The preference information, for example, may depend on the clustering technique employed. For example, the betweenness-threshold may be provided in the case of a clustering framework employing a Girvan-Newman technique. In other cases, k is related or equal to the number of clusters to generate by the function.

When the cluster function is called, preference degrees $\pi_{ij}$ between all objects of the data set are calculated based on the preference information. For example, preference degrees are calculated using Equation 2. The preference degrees may be stored in a preference degrees matrix Π. After preference degrees for the data set are calculated, preference relationships of the objects are defined. For example, $P_I$, $P_J$, $P_{P+}$ and $P_{P-}$ are defined based on a threshold λ. The threshold λ, for example, may be set at 0.5.

The process continues to compute the sets $P_R^a = \{x | aP_R x, \forall x \in A\}$ for the relationships $P_I$, $P_J$, $P_{P+}$ and $P_{P-}$. Afterwards, the similarity measures $S(a_i, a_j)$ are calculated. The similarity measures may be stored in a similarity matrix δ. A distance matrix Δ may be derived from the similarity matrix. A similarity network may be constructed from the distance matrix. For example, the similarity network may be similar to that described in FIG. 3b.

In one implementation, clusters are generated. The clusters are generated using a Girvan-Newman technique. When employing a Girvan-Newman technique, a betweenness-threshold is defined or provided by the user. Thereafter, betweenness of edges are computed. For example, betweenness of edges of the similarity network are computed using Equation 4. Betweenness values below the betweenness-threshold value are removed. The edge with the highest betweenness value is removed. Calculating and removing the edge with the highest betweenness value is repeated until no edges are left. This results in clusters, which are displayed by the function.

Referring back to FIG. 2, the ordering module 258 determines an order of the clusters produced by the clustering module. In one implementation, determining the order of the clusters includes counting the number of preference edges between a pair of clusters. In one implementation, the number of preference edges between each pair of clusters produced by the clustering module is determined.

Figure 8A:
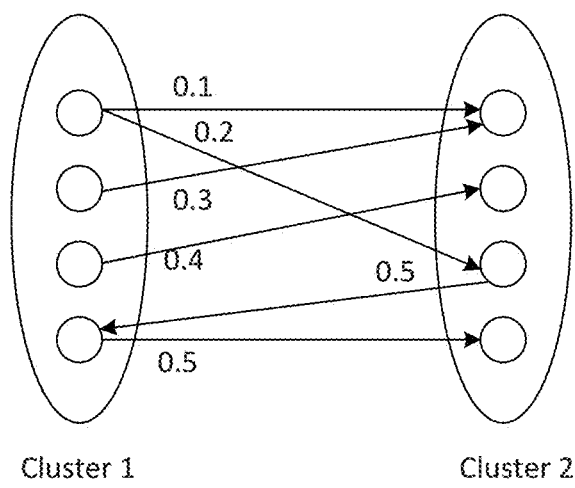
FIGS. 8a-b show examples of determining the order of clusters.

FIG. 8a illustrates an example of counting preference edges between a pair of clusters (cluster 1 and cluster 2). Counting preference edges between a pair of clusters include counting preference edges from a first cluster (cluster 1) to the second cluster (cluster 2) as well as from the second cluster (cluster 2) to the first cluster (cluster 1). Preference edges within a cluster are ignored. The cluster having the greater number of preference edges to the other clusters may be considered the cluster with the stronger preference.

As shown, cluster 1 has five preference edges to cluster 2, as indicated by the direction of the preference edges (arrow points). On the other hand, cluster 2 has one preference edge to cluster 1. Since cluster 1 has a greater number of preference edges, the preference from cluster 1 to cluster 2 is stronger than the preference from cluster 2 to cluster 1. The order of the clusters may be based on the number of preferences edges. The higher the number of preference edges, the higher the cluster in the preference order. For example, cluster 1 would be prior to cluster 2 in the order (cluster 1=>cluster 2).

In some implementations, preference values of the preference edges may be used in determining preference order. For example, after counting the preference edges, the preference values of the preference edges are added to obtain a sum of preference values of the preference edges. The cluster with the higher sum of preference values of preference edges would be prior in the preference order. For example, preference edges of cluster 1 have preference values of 0.1, 0.2, 0.3, 0.4 and 0.5. The sum of the preference values of cluster 1 preference edges is 1.5. On the other hand, the preference edge of cluster 2 has a preference value of 0.5. As such, cluster 1 is prior to cluster 2 in the order (cluster 1=>cluster 2).

Figure 8B:
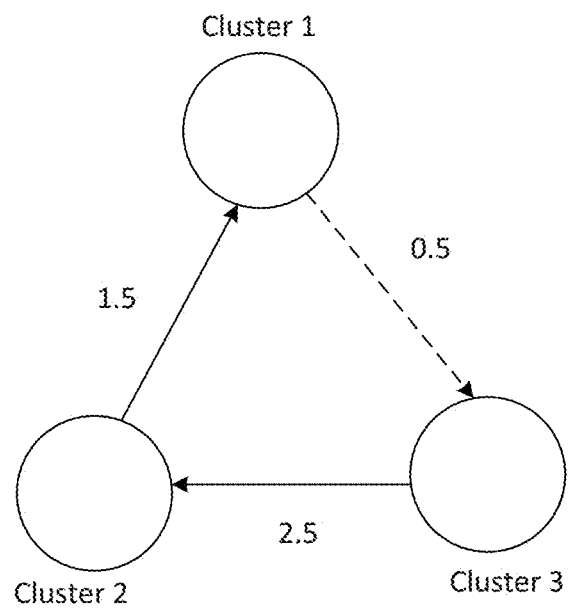

In some instances, the preference order may result in a circle among clusters. For example, as shown in FIG. 8b, cluster 1 is prior to cluster 2 (cluster 1=>cluster 2), cluster 2 is prior to cluster 3 (cluster 2=>cluster 3), cluster 3 is prior to cluster 1 (cluster 3=>cluster 1). In one implementation, the weakest link is removed. In the example, the link between cluster 1 and 3 is the weakest of the links with respect to the sum of the preference values. As such, the link between clusters 1 and 3 is removed, as indicated by the dotted arrow. After the removal of the weakest link, the order is cluster 3 =>cluster 2=>cluster 1.

As discussed, preference information, such as the various parameters are provided to the clustering framework. The preference information may include the following parameters for the different factors or criteria:

w=weight of a criterion;
q=indifference threshold of a criterion; and
p=preference threshold of a criterion.

Other information, including λ, may also be provided as well. The preference information is provided by the user, such as the decision maker. A preference input module may be provided to receive the preference information from the user. For example, the preference input module may include a preference input GI for users to input preference information.

Figure 9:
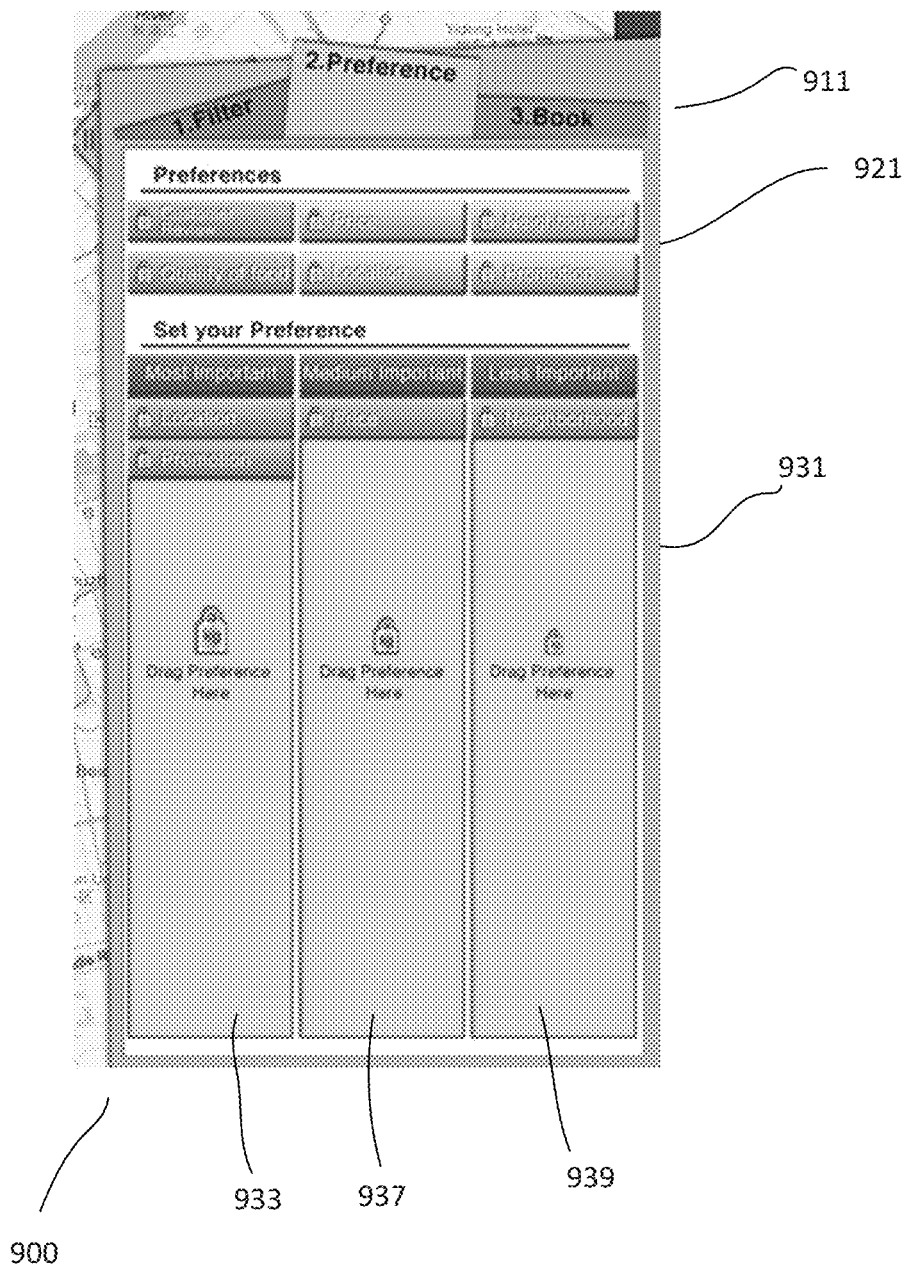
FIG. 9 shows an exemplary embodiment of a preference input graphical interface for collecting preference information from a user.

FIG. 9 shows an exemplary embodiment of a preference input GI 900 for collecting preference information from a user, such as the decision maker. As shown, the input GI includes a menu panel 911. The menu panel, for example, includes a filter, preference and book items for selection by the user. The filter item enables a user to filter out unwanted objects. For example, in the case where objects are restaurants, a user may use the filter item to create a list of available restaurants. The book item may be selected to, for example, make a booking or reservation with a selected object, such as a restaurant or a hotel.

When the preference item is selected, a preference pane 921 and a preference setting pane 931 are displayed in the GI. The preference pane includes various preferences or criteria associated with the data set. For example, the preferences may be related to a data set for restaurants. The preferences may include a customer review criterion, price criterion, neighborhood criterion, quality criterion, location criterion and promotions criterion. Each criterion receives a weight category. The weight categories may be most important 933, medium important 937 and less important 939. This can be used by the user to indicate the weight of each criterion instead of giving precise values. In some implementations, a user may provide specific weight values. Other techniques for providing preference information may also be useful.

The clustering framework may be embodied as an application. For example, the clustering framework may be embodied as a software application. The source code of the applications may be compiled to create an executable code. The codes, for example, may be stored in a storage medium, such as one or more storage disks or in memory of a server and/or end-user devices. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of clustering comprising:
   obtaining preference information of a user for a data set comprising a plurality of objects;
   calculating preference degrees for all ordered pairs of the objects in the data set based on the preference information, wherein the preference degrees are asymmetrical;
   calculating similarity measures for all pairs of objects in the data set based on the preference degrees calculated for respective pairs of objects, wherein the similarity measures are symmetrical;
   generating one or more clusters from the data set based on the similarity measures between objects, wherein a cluster comprises one or more objects from the data set; and
   providing the one or more clusters to the user, wherein the user has access to the objects within the clusters.

2. The computer-implemented method of claim 1, wherein the preference information comprises a set of factors for the data set, wherein a factor of the set of factors is a criterion and the set of factors is a set of criteria.

3. The computer-implemented method of claim 2, wherein preference information comprises a set of values for each criteria in the set of criterion, wherein the set of values comprises a preference threshold p an indifference threshold q and a weight w.

4. The computer-implemented method of claim 3, wherein preference information further comprises a veto threshold.

5. The computer-implemented method of claim 3, wherein calculating preference degrees comprises calculating preference degrees based on a parameter λ, wherein λ is a threshold parameter and adjustable by the user.

6. The computer-implemented method of claim 2, wherein calculating preference degrees comprises performing pairwise comparisons of a first object $a_i$ in the data set to a second object $a_j$ in the data set, wherein a preference degree $\pi_{ij}$ is the preference degree of object $a_i$ to object $a_j$.

7. The computer-implemented method of claim 6, wherein calculating preference degrees further comprises:

for all ordered pairs of objects in the data set:
   (i) calculating unicriterion preference degrees for all factors in the set of factors based on the preference information, wherein a unicriterion preference degree $P_{ij}^k$ reflects how strongly object $a_i$, is preferred over object $a_j$, based on a criterion fk of the set of criteria; and
   (ii) aggregating the unicriterion degrees to produce the preference degree $\pi_{ij}$.

8. The computer-implemented method of claim 7, wherein the unicriterion preference degree is equal to:

$$P_{ij}^k = \begin{cases} 0 & \text{if } f_k(a_i) - f_k(a_j) \leq q_k \\ \frac{[f_k(a_i) - f_k(a_j) - q_k]}{[p_k - q_k]} & \text{if } q_k < f_k(a_i) - f_k(a_j) < p_k \\ 1 & \text{if } f_k(a_i) - f_k(a_j) \geq p_k \end{cases}$$

where
   $p_k$ is preference threshold for the $k^{th}$ criterion in the set of criteria, and
   $q_k$ is indifference threshold for the $k^{th}$ criterion in the set of criteria.

9. The computer-implemented method of claim 8, wherein the unicriterion degrees are aggregated by:

$$\pi(a_i, a_j) = \pi_{ij} = \sum_{k=1}^{y} w_k * P_{ij}^k.$$

10. The computer-implemented method of claim 6 wherein the pairwise comparison between objects $a_i$ and $a_j$ includes a threshold parameter λ, and further comprises:
   (i) $a_i P_I a_j \Leftrightarrow |\pi_{ij} - \pi_{ji}| < \lambda$ and $\pi_{ij} < \lambda$, where $P_I$ is an indifference relationship;
   (ii) $a_i P_J a_j \Leftrightarrow |\pi_{ij} - \pi_{ji}| < \lambda$ and $\pi_{ij} > \lambda$, where $P_J$ is an incomparable relationship; and
   (iii) $a_i P_{P+} a_j \Leftrightarrow |\pi_{ij} - \pi_{ji}| > \lambda$ and $\pi_{ij} > \lambda \Leftrightarrow a_j P_{P-} a_i$, where $P_{P+}$ is a preferred to relationship and $P_{P-}$ is a preferred by relationship.

11. The computer-implemented method of claim 10, wherein λ is equal to 0.5.

12. The computer-implemented method of claim 2 further comprising:
   deriving distances between objects from the similarity measures;
   generating a similarity network based on the distances; and
   generating clusters from the similarity network.

13. The computer-implemented method of claim 12 further comprising:
   calculating betweenness centrality of edges in the similarity network; and
   wherein generating clusters is further based on the betweenness centrality of edges.

14. The computer-implemented method of claim 13, wherein generating clusters further comprises:
   (i) removing the edge of the similarity network with the highest betweenness centrality;
   (ii) recalculating betweenness centrality for remaining edges which are affected by removal of the edge with the highest betweenness centrality; and
   (iii) if there are any edges remaining, repeating steps (i) and (ii), otherwise, return the resulting clusters.

15. The computer-implemented method of claim 1 further comprising determining an order of the clusters.

16. The computer-implemented method of claim 15 wherein determining the order of the clusters is based on a number of preference edges between a pair of clusters, wherein a cluster with a larger number of preference edges between the pair of clusters is preferred over an other cluster of the pair of clusters and is prior in order to the other cluster.

17. A clustering system comprising:
one or more memories;
one or more processing units coupled to the one or more memories; and
one or more non-transitory computer readable storage media storing instructions that, when loaded into the one or more memories, cause the one or more processing units to perform operations for:
providing a user interface for obtaining user preference information of a user;
calculating preference degrees of all ordered pairs of objects in a data set comprising a plurality of objects based on the user preference information;
calculating similarity measures for all pairs of objects in the data set based on the preference degrees, wherein the similarity measures are calculated using intersecting preference degrees for the respective ordered pairs of objects;
generating one or more clusters from the data set based on the similarity measures between objects, wherein a cluster comprises one or more objects from the data set; and
determining an order of the clusters based on the preferences degrees for ordered pairs of objects between the clusters; and
displaying the ordered one or more clusters to the user via the user interface, wherein one or more objects within the cluster are available for display.

18. The clustering system of claim 17, wherein the similarity measures are calculated using:

$$S(a, b) = \left( \sum_{1}^{4} |P_R^a \cap P_R^b| \right) / |A|$$

wherein a is a first object from the data set, b is a second object from the data set, S(a,b) is a similarity measure for objects a and b, $P_R^a$ is a set of preference degrees for object a, $P_R^b$ is a set of preference degrees for object b, and A is a total number of objects in the data set.

19. One or more non-transitory computer-readable media having computer-readable program code tangibly embodied therein, the computer-readable program code adapted to be executed by a processor to implement a method for clustering comprising:
providing a data set comprising a plurality of objects;
obtaining preference information of a user for the data set via a user interface;
calculating preference degrees for all ordered pairs of objects in the data set based on the preference information, wherein the preference degrees for an object comprises a set of preferences and wherein the preference degrees are asymmetrical;
calculating similarity measures for all pairs of objects in the data set based on the preference degrees, wherein a similarity measure for a first object and a second object is calculated by the sum of the absolute value of the intersection of the set of preferences for the first object and the set of preferences for the second object, the sum divided by the total number of objects in the data set, thereby transforming the asymmetrical preference degrees into symmetrical similarity measures;
calculating distances between objects based on the similarity measures to generate a similarity network;
generating one or more clusters from the data set based on the similarity network, wherein a cluster comprises one or more objects from the data set;
ordering the one or more clusters based on the preference degrees for ordered pairs of objects, wherein the objects in the ordered pairs are in different clusters; and
reporting the ordered one or more clusters to the user, wherein the report includes the objects within the clusters.

20. The one or more non-transitory computer-readable media of claim 19, wherein the preference information comprises a set of factors for the data set, wherein a factor of the set of factors is a criterion and the set of factors is a set of criteria.

* * * * *